United States Patent
Nakajima et al.

(10) Patent No.: US 9,522,434 B2
(45) Date of Patent: Dec. 20, 2016

(54) WIRE ELECTRIC DISCHARGE MACHINE AND WIRE ELECTRODE FORWARDING METHOD USED IN THE SAME

(75) Inventors: Yoji Nakajima, Chiyoda-ku (JP); Takuya Ogawa, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 302 days.

(21) Appl. No.: 14/342,658

(22) PCT Filed: Oct. 13, 2011

(86) PCT No.: PCT/JP2011/005722
§ 371 (c)(1),
(2), (4) Date: Mar. 14, 2014

(87) PCT Pub. No.: WO2013/054377
PCT Pub. Date: Apr. 18, 2013

(65) Prior Publication Data
US 2014/0224669 A1 Aug. 14, 2014

(51) Int. Cl.
*B23H 7/10* (2006.01)
(52) U.S. Cl.
CPC .............. *B23H 7/105* (2013.01); *B23H 7/10* (2013.01); *B23H 7/102* (2013.01)
(58) Field of Classification Search
CPC ............ B23H 7/10; B23H 7/102; B23H 7/105
See application file for complete search history.

(56) References Cited

U.S. PATENT DOCUMENTS 6,078,019 A * 6/2000 Medici .................. B23H 7/10
219/69.12

FOREIGN PATENT DOCUMENTS

| JP | 59-014428 A | | 1/1984 |
|---|---|---|---|
| JP | 63-180421 A | * | 7/1988 |
| JP | 01-011729 A | * | 1/1989 |
| JP | 64-011729 A | | 1/1989 |
| JP | 64-040223 A | | 2/1989 |
| JP | 01-135426 A | | 5/1989 |
| JP | 01-210233 A | * | 8/1989 |
| JP | 03-234425 A | | 10/1991 |
| JP | 07-276146 A | | 10/1995 |
| JP | 09-262721 A | | 10/1997 |
| JP | 2001-225227 A | | 8/2001 |

OTHER PUBLICATIONS

Machine translation of Japan Patent No. 01-011,729, Mar. 2016.*
(Continued)

*Primary Examiner* — Geoffrey S Evans
(74) *Attorney, Agent, or Firm* — Sughrue Mion, PLLC; Richard C. Turner

(57) ABSTRACT

A wire electric discharge machine includes: a wire electrode supporting device that holds one end portion of a wire electrode; and a wire electrode forwarding device that has a forwarding device supplying a fluid to forward the wire electrode from a wire electrode guiding section to a wire electrode collecting section, a rotating body positioned on a path between the forwarding device and the wire electrode collecting section and diverting the forwarding direction of the wire electrode, and a rotation restraining device restraining rotation of the rotating body rotated by the fluid supplied from the forwarding device.

6 Claims, 6 Drawing Sheets

(56) References Cited

OTHER PUBLICATIONS

Communication dated Jun. 3, 2015 from the State Intellectual Property Office of the P.R.C. in counterpart application No. 201180074105.6.
International Search Report of PCT/JP2011/005722 dated Jan. 17, 2012.

\* cited by examiner

WIRE ELECTRIC DISCHARGE MACHINE AND WIRE ELECTRODE FORWARDING METHOD USED IN THE SAME

CROSS REFERENCE TO RELATED APPLICATIONS

This is a National Stage of International Application No. PCT/JP2011/005722 filed Oct. 13, 2011, the contents of which are incorporated herein by reference in its entirety.

TECHNICAL FIELD

The present invention relates to a wire electric discharge machine producing electric discharge phenomena between a wire electrode and a work piece to machine the work piece, and a wire electrode forwarding method used in the same.

BACKGROUND ART

In an electric discharge machine, it is general that a wire electrode having a diameter of 0.1 mm to 0.3 mm is used and an automatic wire electrode threading device automatically passes the wire electrode, sequentially through an upper wire electrode guiding section above a work piece, a machining start hole formed in the work piece in advance, a lower wire electrode guiding section under the work piece and a lower roller, to a wire electrode collecting section to complete the threading.

However, a hole formed in a die of the lower wire electrode guiding section generally has a hole shape whose diameter is larger than that of the wire electrode by about 10 μm, and a lower power supply contactor in contact with the wire electrode to supply a current and a lower guide putting the wire electrode easily into contact with the lower power supply contactor are arranged in positions so as to be in contact with the wire electrode; therefore, frictional resistance acts on the tip and the side face of the wire electrode. For this reason, actions made only by a wire electrode feeding roller of the automatic wire electrode threading device, a pressurized fluid flowing in a wire electrode guide pipe of the automatic wire electrode threading device, and a jet stream from a jet nozzle of the upper wire electrode guiding section are sometimes not enough for the wire electrode to be transferred automatically, thereby resulting in an incomplete threading. A wire electrode having a smaller diameter tends to bent, thus the wire electrode is sometimes not transferred automatically despite reduced resistance, also resulting in an incomplete threading.

To solve the above-described problem, a method (refer to Patent Document 1, for example) is disclosed in which a negative pressure is generated by pouring a pressurized fluid in an aspirator so that a wire electrode is sucked and transferred smoothly from a lower wire electrode guiding section to a wire electrode feeding mechanism, and then the direction of the wire electrode is diverted by the pressurized fluid in the wire electrode feeding mechanism so that the wire electrode is transferred to a wire electrode collecting section by the pressurized fluid flowing through a lower guide pipe.

Furthermore, an another method (refer to Patent Document 2, for example) is disclosed in which when the wire electrode is in a wire electrode forwarding section after passing through a lower wire electrode guiding section, the wire electrode is transferred to a wire electrode collecting section by a rotatory force strengthening means that jets a fluid toward a blade provided on the side face of a lower roller (referred to a feeding roller in Patent Document 2) to impart rotatory force to the lower roller. Prior Art Document Patent Document Patent Document 1: Japanese Patent Laid-Open No. H01-135426 (for example, from line 1 of upper left section of page 5 to line 6 of lower left section thereof, and FIG. 2)

Patent Document 2: Japanese Patent Laid-Open No. H07-276146 (for example, paragraph 0025 and FIG. 5)

DISCLOSURE OF INVENTION

Problem to be Solved by the Invention

In a method in which, as described in Patent Document 1, the wire electrode is transferred by the fluid supplied to the aspirator sucking the wire electrode, the fluid-caused surface resistance rotates the lower roller (referred to as a V-groove roller in Patent Document 1) in a direction in which the wire electrode is transferred, so that friction acts on the wire electrode from the lower roller surface. This results in a problem that the wire electrode clings onto the lower roller to be inserted between a lower roller block (a wire electrode feeding mechanism in Patent Document 1) and the lower roller, or be wound around the lower roller. Furthermore, in a case where the fluid is a liquid, the surface tension of the fluid on the lower roller makes the wire electrode easily cling onto the lower roller, resulting in a problem that the wire electrode is wound around the lower roller.

Also in Patent Document 2, the lower roller is rotated in a transfer direction of the wire electrode by a rotatory force strengthening means, so that similarly to Patent Document 1, friction acts on the wire electrode from the lower roller surface, resulting in a problem that the wire electrode is wound around the lower roller.

The present invention is made to solve the above-mentioned problem and aims to obtain a wire electric discharge machine that reduces the speed of a rotating body in rotation or halts the rotation thereof to prevent the wire electrode from being wound around the rotating body, for transferring the wire electrode to a wire electrode collecting section.

Means for Solving Problem

A wire electric discharge machine according to the present invention includes: a wire electrode supporting means that holds one end portion of a wire electrode; and a wire electrode forwarding device that has a forwarding means supplying a fluid to forward the wire electrode from a wire electrode guiding section to a wire electrode collecting section, a rotating body positioned on a path between the forwarding means and the wire electrode collecting section and diverting the forwarding direction of the wire electrode, and a rotation restraining means restraining rotation of the rotating body rotated by the fluid supplied from the forwarding means.

Effect of the Invention

According to a wire electric discharge machine of the present invention, a rotation restraining means is provided to restrain the rotation of a rotating body, so that the rotating body can be slowed down or halted, giving an effect that a wire electrode can be transferred to a wire electrode collecting section while being prevented from its wiring around the rotating body.

MODES FOR CARRYING OUT THE INVENTION

Figure 1:
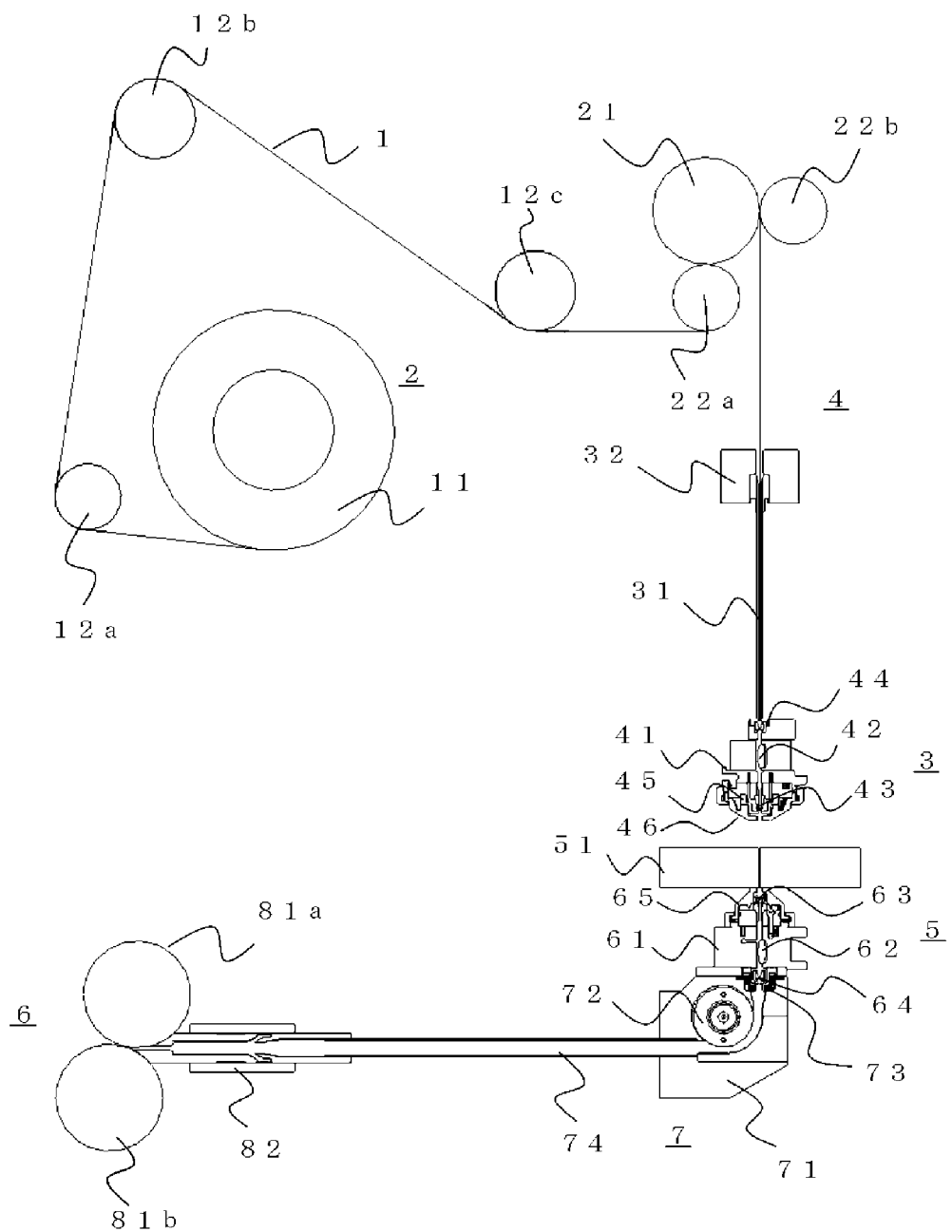
FIG. 1 is a schematic diagram of the configuration of a wire electric discharge machine of Embodiment 1 according to the present invention.

Embodiment 1 FIG. 1 is a schematic diagram of the configuration of a wire electric discharge machine of Embodiment 1 according to the present invention.

In FIG. 1, the wire electric discharge machine includes a wire electrode holding section 2, an upper wire electrode guiding section 3, an automatic wire electrode threading device 4, a lower wire electrode guiding section 5, a wire electrode collecting section 6, and a wire electrode forwarding section 7. The wire electrode holding section 2 (a wire electrode supporting means) includes a wire electrode bobbin 11 around which a wire electrode 1 is wound, a supporting means that rotatably supports the wire electrode bobbin 11 to support the tip portion of the wire electrode, and pulleys 12a, 12b, and 12c that divert the direction of the wire electrode 1.

The upper wire electrode guiding section 3 includes an upper wire electrode guiding block 41, an upper power supply contactor 42 that is in contact with the wire electrode 1 to supply a current, an upper die 43 that supports the wire electrode 1 during machining, an upper guide 44 that puts the wire electrode 1 easily into contact with the upper power supply contactor 42, a jet nozzle 45 that ejects a jet stream to pass the wire electrode 1 through a machining start hole of a work piece 51 and leads the wire electrode to the lower wire electrode guiding section 5, and an upper machining fluid nozzle 46 that sprays a machining fluid to the work piece 51 during machining.

The automatic wire electrode threading device 4 includes a wire electrode feeding roller 21 that forwards the wire electrode 1, wire electrode feeding pinch rollers 22a and 22b that wind the wire electrode 1 around the wire electrode feeding roller 21 and support the wire electrode, a guide pipe 31 that guides the wire electrode 1 to the upper wire electrode guiding section, and a guide pipe head 32 that pours a fluid into the guide pipe.

The lower wire electrode guiding section 5 includes a lower wire electrode guiding block 61, a lower power supply contactor 62 that is in contact with the wire electrode 1 to supply a current, a lower die 63 that supports the wire electrode 1 during machining, a lower guide 64 that puts the wire electrode 1 easily into contact with the lower power supply contactor 62, and a lower machining fluid nozzle 65 that sprays a machining fluid to the work piece 51 during machining.

The wire electrode collecting section 6 includes wire electrode collecting rollers 81a and 81b that collect the wire electrode 1, and a wire electrode collection pipe end 82 that separates the wire electrode 1 from the fluid.

The wire electrode forwarding section 7 includes a lower roller block 71, a lower roller 72 that is rotatably supported by the lower roller block 71 and diverts the direction of the wire electrode 1, an aspirator 73 (a forwarding means) that produces a negative pressure for easily forwarding the wire electrode 1 from the lower die 63 to a lower guide 64 and also ejects and supplies a fluid so that the wire electrode 1 is easily transferred by suction and forwarded to a wire electrode collecting section, and a lower guide pipe 74 that guides the wire electrode 1 to a wire electrode collecting section 6. The lower roller 72 is rotated by the fluid supplied from the aspirator 73.

The electric discharge machine machines the work piece 51 into an arbitrary shape in a coping saw manner by applying, while the wire electrode 1 is collected by the wire electrode collecting section 6, a pulse voltage between the wire electrode 1 and the work piece 51 to produce electric discharges, and by moving the work piece 51 relatively to the upper wire electrode guiding section 3 and the lower wire electrode guiding section 5.

Figure 2:
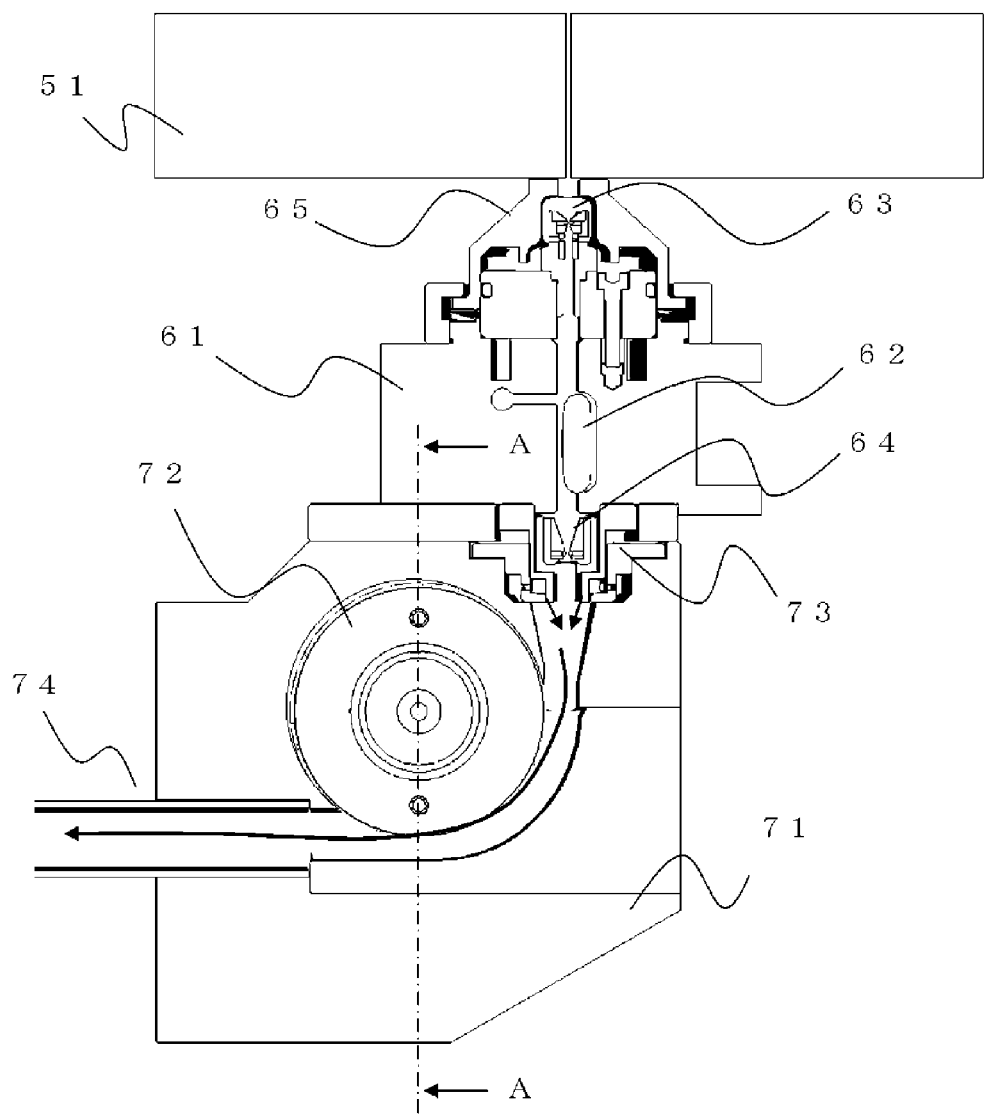
FIG. 2 is a partially enlarged view of a wire electrode forwarding device of Embodiment 1 according to the present invention.
Figure 3:
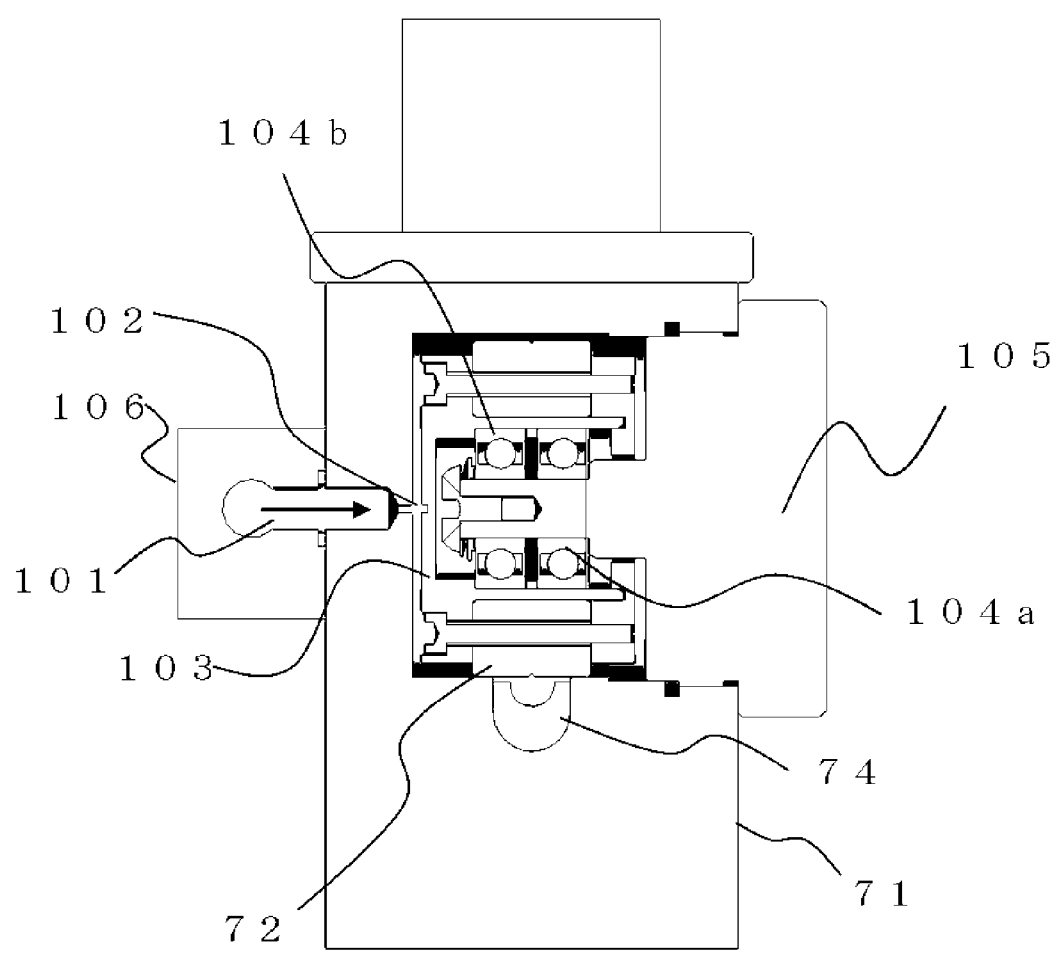
FIG. 3 is a partially cross-sectional view of the wire electrode forwarding device of Embodiment 1 according to the present invention.

FIG. 2 is a partially enlarged view of a wire electrode forwarding device in the wire electric discharge machine of Embodiment 1 according to the present invention. FIG. 3 is an A-A cross-sectional view showing the vicinity of the lower roller in the wire electrode forwarding device of Embodiment 1 according to the present invention. Other components not shown in the figures are the same as those in FIG. 1; therefore, they are appropriately omitted. In FIG. 2 and FIG. 3, the lower roller block 71 is provided with an ejection outlet 102 of an ejection means 101 that ejects a liquid such as water or oil that is typically used as a machining fluid in the wire electric discharge machine. The lower roller block 71 is provided with the lower roller 72 so that the lower roller can rotate around the axis to divert the direction of the wire electrode 1 from an up-down direction to a horizontal direction. A lower roller holder 103 is fixed to a side face of the lower roller in such a manner that the rotation axis of the lower roller holder is aligned with that of the lower roller, so that the lower roller holder 103 becomes integrated with the lower roller 72 to rotate in the same direction. Here, the integrated component is called as a rotating body. The rotating body is positioned on a path between the aspirator 73 and the wire electrode collecting section. Furthermore, in order to slow down or halt the lower roller 72, the lower roller holder 103 is provided with an impeller-shaped portion that generates rotation restraint force acting to rotate the rotating body in a direction opposite to (counter-clockwise, in FIG. 2) a direction of the rotation caused by ejecting the liquid from the aspirator 73 and collecting the wire electrode.

Figure 4:
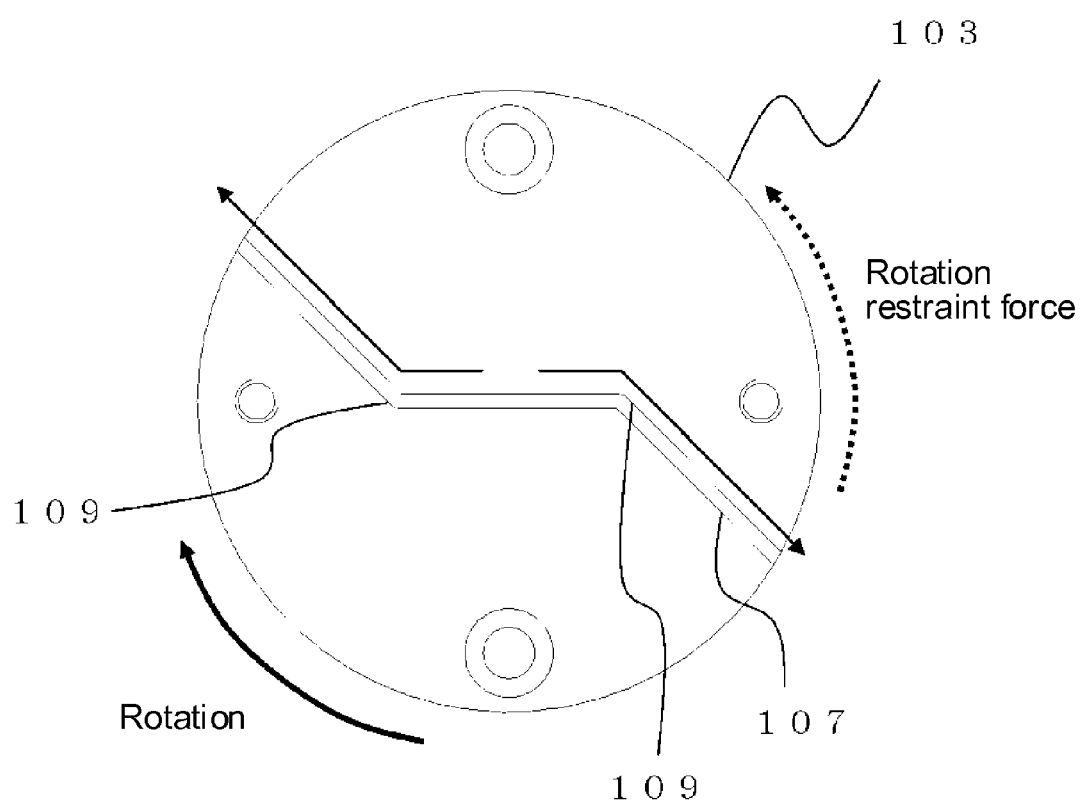
FIG. 4 is an enlarged view of a lower roller holder of Embodiment 1 according to the present invention.

FIG. 4 is a view that outlines the lower roller holder 103. In FIG. 4, a side face of the lower roller holder 103 is provided with an impeller-shaped portion 107 which is a groove formed to serve as a water channel producing a water stream in arrow directions when the ejection means 101 ejects the liquid to a center portion of the roller holder side face. Furthermore, the impeller-shaped portion 107 (an ejection fluid reception portion) is a channel having pressure reception faces 109 formed for receiving the pressure of the liquid ejected to the lower roller holder 103 from the ejection means 101; therefore, when the liquid is ejected to the lower roller holder 103, the pressure reception faces 109 receive the pressure of the liquid, thereby producing rotatory force in a direction opposite to that of the rotating body's rotation. Here, the ejection means 101 and the impeller-shaped portion 107 are collectively called as a rotation restraining means.

More specifically, the impeller-shaped portion 107 includes the channel that extends radially from the center portion of the lower roller holder side face so as to allow the liquid having been ejected in the rotation axis direction of the lower roller holder 103 from the ejection outlet 102 provided in the lower roller block 71 to flow in a radial direction of the lower roller holder 103, and includes channels that extend from the ends of the radially extending channel, obliquely toward the direction in which the lower roller holder 103 rotates by the liquid ejected from the aspirator 73. In addition, the impeller-shaped portion 107 may be formed by providing partitions on the side face of the lower roller holder 103 so as to form a channel, or by providing a groove on the lower roller holder. The material of the impeller-shaped portion 107 is thought to be metal such as stainless steel and brass, or resin such as PPS; however it is preferable that the material has a property resistant to the machining fluid.

Lower roller bearings 104a and 104b are devices that allow the lower roller 72 to easily rotate, and are provided on a circumferential face of a lower roller shaft 105 that supports the lower roller 72. That is, the lower roller 72 is rotatably fitted to the lower roller shaft 105 through the lower roller bearings 104a and 104b. A piping block 106 is fixed to the lower roller block 71 and delivers the liquid through a pipe provided in the piping block 106, to the ejection outlet 102 ejecting the liquid to the lower roller holder 103. The ejection outlet 102 extends in the rotation axis direction of the lower roller holder 103, and ejects the liquid in the rotation axis direction of the lower roller holder 103.

Next, operation of the wire electric discharge machine of the present invention will be explained. In FIG. 1 and FIG. 2, the wire electrode 1 is forwarded by the automatic wire electrode threading device 4 to pass through the upper die 43, and then the wire electrode 1 is passed through the machining start hole of the work piece 51 by the stream ejected from the jet nozzle 45. After that, when the wire electrode is transferred to the lower die 63, a liquid is supplied to the aspirator 73. On supplying the fluid to the aspirator 73, a negative pressure for sucking and transferring the wire electrode 1 is produced in the lower wire electrode guiding section 5, so that the tip of the wire electrode 1 passes from the lower die 63 to the lower guide 64.

The wire electrode 1 having passed through the lower guide 64 is subjected to the resistance of the liquid ejected from the aspirator 73, to thereby be forwarded to the lower roller 72. Because the lower roller 72 is for diverting the direction of the wire electrode 1 and not for forwarding the wire electrode 1 by the rotation of the lower roller 72, it is not always necessary that the lower roller rotates during operation of automatic threading of the wire electrode. But because the lower roller 72 is placed through the bearings around the lower roller shaft 104a in order that the rotation load is reduced as much as possible to stably divert the direction of the wire electrode 1 during the wire electric discharge machining operation, the lower roller surface is subjected to the resistance of a stream produced by the liquid ejected from the aspirator 73, causing the lower roller 72 to rotate.

It is needless to say that because rotatory force produced by the liquid ejected from the aspirator 73 to rotate the lower roller 72 is force produced by the liquid's frictional resistance acting on the lower roller surface, the rotatory force can be adjusted by, for example, a surface area of the lower roller 72 with which the liquid is in contact, the speed of the liquid, and the density thereof. However, the lower roller 72 easily rotates when a necessary amount of the liquid is ejected in order that the wire electrode 1 passes through the lower guide pipe 74 and reaches to the wire electrode collecting section 6.

When supplying the liquid to the aspirator 73, a liquid is supplied to the piping block 106 through a pipe route different from that used for supplying the liquid to the aspirator 73, to be ejected to the impeller-shaped portion of the lower roller holder 103 from the ejection outlet 102 provided in the lower roller block 71, so that the lower roller is subjected to rotation restraint force that imparts rotation force to the lower roller in a direction opposite to a direction in which the wire electrode 1 is transferred, resulting that the lower roller 72 slows down or halts. The liquid having been ejected from the ejection outlet 102 in the axis direction of the lower roller holder 103 is discharged from the impeller-shaped portion, and then collected into the guide pipe 74.

In FIG. 4, the ejected liquid flows (in the directions of arrows in the figure) in the groove formed in the impeller-shaped portion 107 provided in the lower roller holder 103 from the center to the outer side (radially); thus, the impeller receives force from the liquid, which acts as rotation restraint force for the lower roller 72 so as to be rotated in a direction opposite to the transfer direction of the wire electrode 1.

It is needless to say that the rotation restraint force rotating the roller in a direction opposite to the transfer direction of the wire electrode 1 can be adjusted by changing the impeller shape, for example, changing the number or the angle of impeller grooves, or by changing the flow amount or the flow speed of the ejection liquid. The lower roller 72 can also be slowed down, halted, or reversely rotated by adjusting lower-roller 72-rotating force produced by the liquid ejected from the aspirator 73.

However, the reverse rotation produces resistance in a direction opposite to the wire electrode transfer direction, to adversely affect the transfer of the wire electrode 1. Therefore, it is preferable to adjust the rotatory force so that the lower side roller does not rotate in the opposite direction.

Furthermore, the wire electrode 1 having a smaller diameter tends to be bent; this causes the wire electrode to easily jam in a gap between the lower roller 72 and the lower roller block 71 and easily wind around the lower roller 72. Thus, a method may be conceivable in which the ejection flow amount of the liquid supplied to the aspirator 73 is controlled so as to be reduced, thereby restraining the rotation to prevent the winding-around. However, a reduction in the ejection flow amount reduces the transfer force, resulting that the wire electrode 1 is not forwarded to the wire electrode collecting section. On the other hand, according to the present invention, the rotation in the direction opposite to the transfer direction of the wire electrode 1 can be restrained while maintaining the transfer force with a large amount of the liquid being supplied to the aspirator 73. Therefore, the wire electrode 1 can be transferred while being prevented from its wiring around the lower roller 72.

If the liquid ejected from the aspirator 73 and the liquid ejected from the ejection means 101 are controlled by respective controllers, the rotation force of the lower roller 72 can be controlled more minutely. If adjustments are further made of the diameter of the ejection outlet 102 in the lower roller block 71 and the diameter of the ejection outlet of the aspirator 73, the same effect can be brought about even when their liquid circuits are simplified by branching a same circuit.

Furthermore, in order to produce greater rotation restraint force, it is preferable to use a fluid having a greater density as the ejection fluid; however, the ejection fluid is not limited to liquid, but can be changed to gas.

After diverting the direction without being wound around the lower roller 72, the wire electrode 1 is transferred to the wire electrode collecting section by being subjected to the resistance produced when the liquid ejected from the aspirator 73 flows through the lower guide pipe 74. In a wire electrode collection pipe end 82, the wire electrode 1 and the liquid are separated, and then, the wire electrode 1 is grasped by the wire electrode collecting rollers 81 to complete the automatic wire electrode threading.

As described above, the wire electrode forwarding device is configured so that the lower roller is subjected to rotation restraint force in a direction opposite to the wire electrode transfer direction so as to be slowed down or halted by jetting the fluid to the impeller-shaped portion which includes the channel extending radially from the side face center portion of the lower roller holder 103 and the channels extending from the ends of the radially extending channel obliquely toward the direction in which the roller holder 103 rotates by the fluid ejected from the aspirator 73; therefore, the wire electrode can be transferred to the wire electrode collecting section while being prevented from its wiring around the lower roller.

Figure 5:
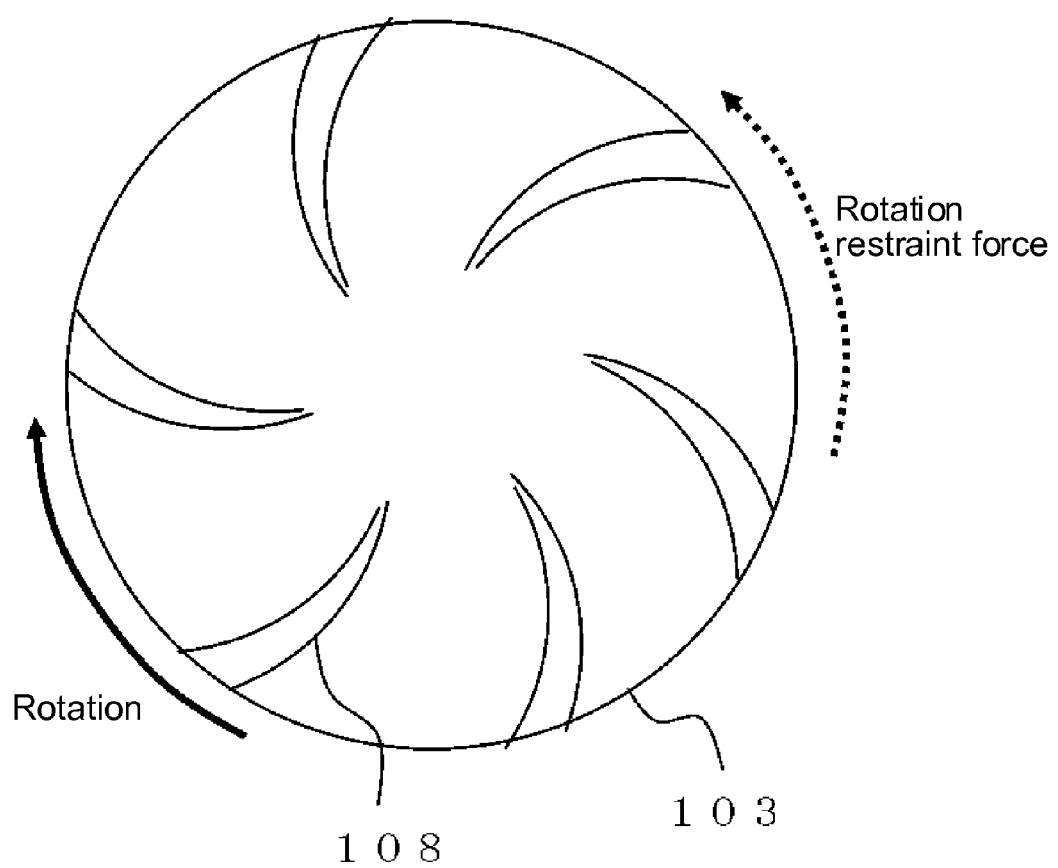
FIG. 5 is an enlarged view of another lower roller holder of Embodiment 1 according to the present invention.

In addition, the impeller-shaped portion that produces the rotation restraint force in a direction opposite to the rotation direction of the lower roller may have a shape shown in FIG. 5, for example. In FIG. 5, a plurality of impeller-shaped portions 108 (ejected fluid reception portions) is provided radiately on the side face of the lower roller holder 103 at circumferential intervals. Furthermore, each impeller-shaped portion 108 has a pressure reception face of arc shape on which the pressure of a machining fluid jetted from the ejection outlet 102 provided in the lower roller block acts effectively, and each impeller-shaped portion is arranged in a manner that the concave face, i.e. the pressure reception face, faces toward the rotation direction of the lower roller holder 103. In addition, the liquid ejected in the axial direction of the roller holder 103 is discharged from the impeller-shaped portion 108 and then collected into the guide pipe.

Furthermore, the impeller-shaped portion can also apply the lower roller rotation restraint force in a direction opposite to the wire electrode transfer direction, by forming grooves in the outer circumferential face of the lower roller holder 103 so that the machining fluid ejects to the grooves formed in the lower roller holder in the backward direction of the rotation.

Figure 6:
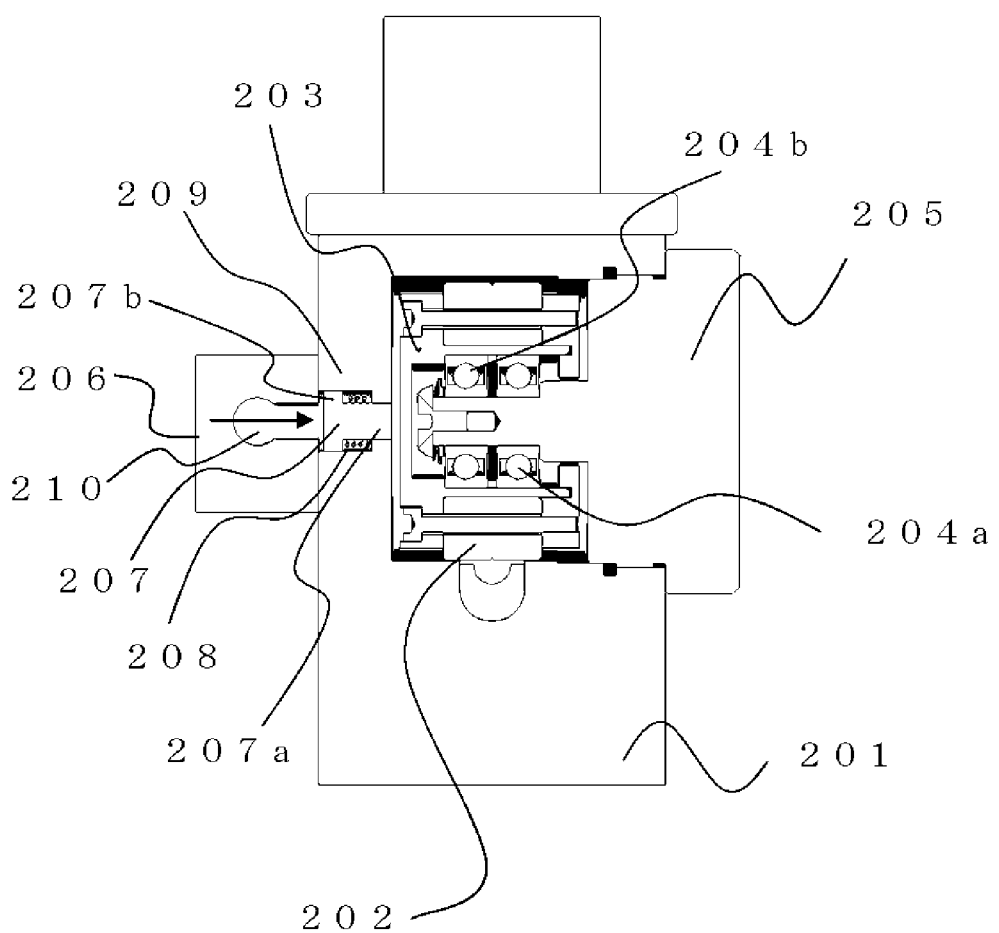
FIG. 6 is a partially cross-sectional view of a wire electrode forwarding device of Embodiment 2 according to the present invention.

Embodiment 2 This embodiment has a basic structure similar to that of Embodiment 1, thus different points therebetween will be mainly explained. Other points are the same as those in Embodiment 1. FIG. 6 is a partially cross-sectional view of a wire electrode forwarding device in a wire electric discharge machine of Embodiment 2 according to the present invention. In FIG. 6, a lower roller block 201 (a rotating body block) is provided with a brake supporting portion 209 that supports a brake member 207. The brake supporting portion 209 includes an inner wall formed by hollowing the lower roller block 201 in a direction of a lower roller shaft 205, a pair of compression coil springs 208 fixed to the inner wall, and a brake member 207 fixed to the pair of compression coil springs 208 provided inside the inner wall. The brake member 207 is made of, for example, rubber, and has a contact portion 207a contactable with a lower roller holder 203, and a retaining portion 207b fixed to the compression coil springs 208. The contact portion 207a is placed between the pair of compression coil springs 208 and extends toward the lower roller shaft 205. The retaining portion 207b is for compressing the compression coil springs 208.

A lower roller 202 is provided rotatably around the axis in the roller block 201 to divert the direction of the wire electrode 1. When an ejection means 210 ejects the fluid to a lower roller holder 203 to push the brake member, the lower roller holder 203 is brought, against the compression coil springs 208, in contact with the contact portion 207a of the brake member so that frictional resistance for slowing down or halting is produced in a direction opposite to the transfer direction. Here, the ejection means 210 and the brake member 207 are collectively called as a rotation restraining means.

Lower roller bearings 204a and 204b are for easily rotating the lower roller, and are provided on an outer circumferential face of the lower roller shaft 205 supporting the lower roller 202. That is, the lower roller 202 is rotatably fitted to the lower roller shaft 205 through the lower roller bearings 204a and 204b. A piping block 206 is fixed to the lower roller block 71 and is for feeding, through the pipe provided in the piping block 106, the liquid pushing the brake member 207 made of rubber. The compression coil springs 208 are springs for putting the brake member 207 back to the original position. In addition, the compression coil springs 208 may be made of an elastic material, as long as the elastic material has elasticity.

In a case where, similarly to Embodiment 1, a wire electrode threading device threads automatically the wire electrode, the liquid is supplied through a pipe in a piping block 206 to the brake supporting portion 209 of the lower roller block 201 so as to push the brake member with the lower roller 202 being rotated by the liquid ejected from the aspirator 73. When the liquid pushes out the brake member 207 to press it against the lower roller holder 203, the lower roller 202 can be slowed down or halted by frictional resistance; therefore, the wire electrode 1 can be transferred while be prevented from being wound around the lower roller 202.

Because frictional resistance is utilized to slow down or halt the lower roller 202, uneven portions on the lower roller holder 203 can produce much frictional resistance to increase the rotation restraint force to the lower roller, thereby slowing down or halting the lower roller 202 with more reliability. In addition, it is needless to say that the effect of pushing out the brake member 207 can also be obtained by using a drive device such as an air cylinder.

After diverting the direction without being wound around the lower roller 72, the wire electrode 1 is transferred through the lower guide pipe 74 to the wire electrode collecting section by being subjected to the resistance of the liquid ejected from the aspirator 73. In a wire electrode collection pipe end 82, the wire electrode 1 and the liquid are separated, and the wire electrode 1 is grasped by the wire electrode collecting rollers 81 to complete the automatic wire electrode threading.

In the wire electrode forwarding device configured as described above, the liquid is supplied, with the lower roller 72 being rotated by the liquid ejected from the aspirator 73, from the piping block 206 to the brake supporting portion 209 of the lower roller block 201 so as to push out the brake member, and then, the brake member 207 that is pushed by the liquid against the compression coil spring presses the lower roller holder 203, thereby producing frictional resistance acting as rotation restraint force in a direction opposite to the wire electrode transfer direction so as to slow down or halt the lower roller holder; therefore, the wire electrode can be transferred to the wire electrode collecting section while being prevented from its wiring around the lower roller.

In addition, the uneven portion on the side face of the lower roller holder 203 may be formed by texture machining or may be formed as dimples. The dimples can be inexpensively machined by, for example, blast machining in which balls are blown against the inner circumferential face with compressed air. Furthermore, protrusions may be formed instead of hollows such as the dimples. The shape of the unevenness formed on the roller holder is not limited to those described above as long as the shape produces frictional resistance.

NUMERALS 1 wire electrode
2 wire electrode holding section
3 upper wire electrode guiding section
4 automatic wire electrode threading device
5 lower wire electrode guiding section
6 wire electrode collecting section
7 wire electrode forwarding section
11 wire electrode bobbin
12a, 12b, 12c pulley
21 wire electrode feeding roller
22a, 22b wire electrode feeding pinch roller
31 guide pipe
32 pipe head
41 upper wire electrode guiding block
42 upper power supply contactor
43 upper die
44 upper guide
45 jet nozzle
46 upper machining fluid nozzle
51 work piece
61 lower wire electrode guiding block
62 lower power supply contactor
63 lower die
64 lower guide
65 lower machining fluid nozzle
71 lower roller block
72 lower roller
73 aspirator
74 lower guide pipe
81a, 81b wire electrode collecting roller
82 wire electrode collection pipe end
101 ejection means
102 ejection outlet
103 lower roller holder
104a, 104b lower roller bearing
105 lower roller shaft
106 piping block
107, 108 impeller-shaped portion
109 pressure reception face
201 lower roller block
202 lower roller
203 lower roller holder
204a, 204b lower roller bearing
205 lower roller shaft
206 piping block
207 brake member
207a contact portion
207b retaining portion
208 compression coil spring
209 brake supporting portion
210 ejection means

The invention claimed is:

1. A wire electric discharge machine comprising:
a wire electrode supporting device that holds one end portion of a wire electrode; and
a wire electrode forwarding device that includes
an aspirator that supplies a fluid to forward the wire electrode from a wire electrode guiding section to a wire electrode collecting section,
a rotating body positioned on a path between the aspirator and the wire electrode collecting section, and diverting the forwarding direction of the wire electrode, and
a rotation restraining device that restrains rotation of the rotating body rotated by the fluid supplied from the aspirator,
wherein the rotating restraining device comprises a brake member that is provided in a rotating body block that rotatably supports the rotating body, and an ejection device that ejects a fluid to the brake member to press the brake member against the rotating body to restrain rotation of the rotating body.

2. The wire electric discharge machine according to claim 1, wherein the fluid ejected from the aspirator and the fluid ejected from the ejection device are controlled by respective fluid control devices.

3. A wire electric discharge machine comprising:
a wire electrode supporting device that holds one end portion of a wire electrode; and
a wire electrode forwarding device that includes:
an aspirator that supplies a fluid to forward the wire electrode from a wire electrode guiding section to a wire electrode collecting section,
a rotating body positioned on a path between the aspirator and the wire electrode collecting section, and diverting the forwarding direction of the wire electrode, and
a rotation restraining device that restrains rotation of the rotating body rotated by the fluid supplied from the aspirator,
wherein the rotation restraining device includes:
an ejection device that ejects the fluid to the rotating body and
an ejection fluid reception portion that is formed in an impeller shape on the rotating body to receive the fluid ejected from the ejection device,
wherein the ejection fluid reception portion is subjected to the pressure of the fluid from the ejection device, so that rotatory force is applied to the rotating body in a direction opposite to a direction in which the rotating body rotates by the fluid supplied from the aspirator, to restrain or halt the rotating body's rotation caused by the supplied fluid.

4. The wire electric discharge machine according to claim 2, wherein the ejection fluid reception portion includes
a channel that extends radially from a center portion of a side face of the rotating body so as to allow the liquid ejected from the ejection device in the rotation axis direction of the side face of the rotating body, to flow in the radial direction of the rotating body, and
a channel that extends from an end of the radially extending channel, obliquely toward the direction in which the rotating body rotates by the liquid supplied by the aspirator.

5. The wire electric discharge machine according to claim 2, wherein the ejection fluid reception portion has a pressure reception face that is a concave face of arc shape, and a plurality of the ejection fluid reception portions is arranged radiately on a side face of the rotating body at circumferential intervals in a manner that each concave face faces toward the rotation direction of the rotating body.

6. A method of forwarding a wire electrode in a wire electric discharge machine, comprising:
- supplying a fluid to forward the wire electrode in a first direction from a wire electrode guiding section to a wire electrode collecting section;
- diverting the first direction of the wire electrode to a second direction, and
- applying a forwarding rotatory force to a rotating body in the second direction in which the supplied fluid forwards the wire electrode through the rotating body; and
- applying a restraining rotatory force in a third direction opposite to the second direction in which the rotating body is rotated, to restrain the rotating body from rotating in the second rotation direction,
- wherein the applying the retraining rotatory force comprises ejecting a fluid to a brake member to press the brake member against the rotating body to restrain the rotating body from rotating in the second rotation direction.

* * * * *